(12) United States Patent
Middleton, III et al.

(10) Patent No.: US 6,393,407 B1
(45) Date of Patent: May 21, 2002

(54) TRACKING USER MICRO-INTERACTIONS WITH WEB PAGE ADVERTISING

(75) Inventors: Thomas M. Middleton, III, Hingham; Gregory T. White, Bedford, both of MA (US)

(73) Assignee: Enliven, Inc., Waltham, MA (US)

( * ) Notice: Subject to any disclaimer, the term of this patent is extended or adjusted under 35 U.S.C. 154(b) by 0 days.

(21) Appl. No.: 09/146,012

(22) Filed: Sep. 2, 1998

Related U.S. Application Data

(60) Provisional application No. 60/058,655, filed on Sep. 11, 1997.

(51) Int. Cl.[7] .............................................. G06F 17/60
(52) U.S. Cl. ........................... 705/14; 705/27; 709/224
(58) Field of Search ............................. 705/10, 14, 27, 705/40; 709/224, 226; 345/333, 334, 335, 145, 146

(56) References Cited

U.S. PATENT DOCUMENTS

| | | | |
|---|---|---|---|
| 5,058,185 A | 10/1991 | Morris et al. ................... 382/41 |
| 5,434,863 A | 7/1995 | Onishi et al. ............. 370/85.13 |
| 5,491,820 A | 2/1996 | Belove et al. ................ 395/600 |
| 5,517,620 A | 5/1996 | Hashimoto et al. .... 395/200.15 |
| 5,557,790 A | 9/1996 | Bingham et al. ............ 395/600 |
| 5,644,713 A | 7/1997 | Makishima ............. 395/200.01 |
| 5,649,185 A | 7/1997 | Antognini et al. ........... 395/609 |
| 5,675,741 A | 10/1997 | Aggarwal et al. ...... 395/200.12 |
| 5,694,545 A | 12/1997 | Roskowski et al. .... 395/200.06 |
| 5,742,610 A | 4/1998 | Natarajan ................... 370/472 |
| 5,748,613 A | 5/1998 | Kilk et al. ................... 370/231 |
| 5,751,971 A | 5/1998 | Dobbins et al. ........ 395/200.68 |
| 5,764,906 A | 6/1998 | Edelstein et al. ....... 395/200.49 |
| 5,796,952 A | * 8/1998 | Davis et al. ................. 709/224 |
| 5,848,396 A | * 12/1998 | Gerace ......................... 705/10 |
| 5,848,397 A | * 12/1998 | Marsh et al. .................. 705/14 |
| 5,913,040 A | * 6/1999 | Rakavy et al. ............... 709/226 |
| 5,933,811 A | * 8/1999 | Angles et al. ................. 705/14 |
| 5,999,914 A | * 12/1999 | Blinn et al. .................... 705/26 |
| 6,020,889 A | * 2/2000 | Tarbox et al. .............. 345/356 |
| 6,054,984 A | * 4/2000 | Alexander .................. 345/339 |

FOREIGN PATENT DOCUMENTS

| | | | |
|---|---|---|---|
| DE | WO 9826346 A1 | * | 6/1998 |
| WO | WO98/26571 | | 6/1998 |

OTHER PUBLICATIONS

Traffic Cops For Web Servers, (Software vendors are offering tools to help network managers handle system resources being used by external & Internet traffic), Information Week, n 597, p44, Sep. 16, 1996.*

(List continued on next page.)

Primary Examiner—Vincent Millin
Assistant Examiner—Hani M. Kazimi
(74) Attorney, Agent, or Firm—Hamilton, Brook, Smith & Reynolds, P.C.

(57) ABSTRACT

In connection with display of advertising within Web pages, an applet is downloaded to the user's Web browser to track the user's interactions with the Web page. Tracked user interactions include mouse cursor position, time displayed on page, time of mouse cursor hovering over the advertisement, and so on. At an appropriate time, such as when the display of the Web page is terminated, the applet forwards logged interaction information from the client to a remote server, the remote server being typically controlled by an advertiser, rating service or the like. As a result, the advertiser may track consumer response to advertising impressions on a Web page without requiring the user to download other pages. This allows advertisers to track user response to specific elements of the Web page as well as to better infer information about the user's interests in an effort to qualify the user prior to presenting subsequent advertising.

1 Claim, 3 Drawing Sheets

OTHER PUBLICATIONS

Internet: Ichat, Now Acuity, Launches Web Call Center, Network briefing, PN/A, Trade, 1360–1369, Jun. 1, 1998.*

BMC Software Inc., "Traffic Cops For Web Servers", Information Week, n 597, p44, Sep. 16, 1996.*

"MPEG–4, the Multimedia Standard," *SPECSTechnology*, 10(2): 1–2, 5 (Mar. 1998).

Cooper, L., "More Than Just Hits," *InformationWeek*, CMP Publications, USA, ISSN 8750–6874, XP002082816, 608:63, 68, 72 (Dec. 2, 1996).

Kamba, T., et al., "the Krakatoa Chronicle—An Interactive, Personalized, Newspaper on the Web," Fourth International World Wide Web Conference, Dec. 11–14, 1995, XP002089804 pp. 1–12, www.w3.org/conferences/www4/papers/93.

Franklin, M., et al., Auditable Metering with Lightweight Security, Financial Cryptography First International Conference, FC '97. Proceedings (Feb. 24–28, 1997), to appear in Financial Cryptography '97, Feb. 1997, Anguilla, BWI (Feb. 24, 1997), XP002065347 pp. 151–160, ISBN 3–540–63594–7, 1997, Berlin, Germany, Springer–Verlag, Germany.

* cited by examiner

TRACKING USER MICRO-INTERACTIONS WITH WEB PAGE ADVERTISING

RELATED APPLICATION

This application claims the benefit of U.S. Provisional Application Serial No. 60/058,655 filed on Sep. 11, 1997, the entire teachings of which are incorporated herein by reference.

BACKGROUND OF THE INVENTION

Distributed computing environments are becoming a very popular mechanism for publishing information of various types. In such an environment, a network of several different types of computers is used in order to share access to information. Certain computers, known as servers, contain databases and other repositories of information. Other computers in the network, known as clients, act as interfaces for the human users to retrieve and display information.

One particularly well known example of a distributed computing environment is the World Wide Web. In this environment, the Web server computers presently in use typically store data files, or so-called Web pages, in a format known as Hypertext Markup Language (HTML). Web pages are transferred between Web servers and clients using a communication protocol known as Hypertext Transfer Protocol (HTTP). HTML permits the Web servers, or sites, to handle container or document files which reference other files of varying formats. Using HTML, a given Web page may include content information in various formats. An HTML format file may also refer to other files, by including reference information, known as a Uniform Reference Locator (URL), which specifies the location of remote Web servers at which the other files may be located.

Certain Web servers, such as those maintained by on-line service providers such as America On Line (AOL™) or Microsoft Network (MSN™), are an increasingly popular way for people to obtain information of interest on the World Wide Web. (AOL™ is a trademark of America On Line, Inc. of Dulles, Va. MSN™ is a trademark of Microsoft Corporation of Redmond, Wash.) Indeed, certain Web sites host search engines such as AltaVista™, Yahoo™, and InfoSeek™ and thus are exclusively devoted to guiding users through the Web. (AltaVista™ is a trademark of Digital Equipment Corporation of Maynard, Mass.; Yahoo™ is a trademark of Yahoo! Corporation of Santa Clara, Calif.; and InfoSeek™ is a trademark of InfoSeek Corporation of Sunnyvale, Calif.). These sites are so popular that their operators provide their services free of charge to users of the Web, and support themselves typically by selling advertising space on their Web pages. Thus, an advertiser, for example, a running shoe manufacturer, may contract with a search service such as Yahoo, or an on-line service, such as AOL, to periodically present its ads on their Web pages in much the same manner that commercials are traditionally purchased from television broadcasters.

Certain tools are presently in use by the providers of such services and advertisers, typically in order to calculate advertising rates. For example, the Web servers at such sites may count the number of times that the Web page containing the advertisement is displayed.

Alternatively, an advertiser may count the number of visits that its own Web page receives as a result of linking from the original Web page advertisement, i.e., the number of times that users request the URL of the advertiser's Web site via the original Web page on which the advertisement was displayed. In the usual model of user interaction with a Web page, this occurs whenever the user clicks (i.e., selects by a mouse input device) on a hypertext item. In many instances, objects such as graphical images or "GIFs" may be clicked on to activate the hypertext links.

Advertisers, however, would like not only to count a number of "impressions," or how many times their advertisement is seen, but also to find a way to track how effective their ads are in attracting consumers' interest in their products.

Advertisers would also like to find a way to more precisely gauge a user's interest in a product, as well as to entice those users who are casually browsing through the World Wide Web, without actually requiring users to download the advertiser's Web page. In this manner, interest in a particular product or promotion could be gauged directly from data surrounding the initial presentation of the advertisement.

SUMMARY OF THE INVENTION

Briefly, the present invention is a technique for tracking user interactions with the elements that comprise a Web page advertisement. As a result, an advertiser may understand (make inferences as to) what motivates users to pay initial attention to and/or otherwise interact with Web page advertising.

The invention, in particular, tracks any sort of user "micro-interaction" with the advertisement. The user interactions which are tracked, for example, may include mouse movement, mouse clicks, and other mouse activity such as it relates to elements in the ad. These elements may include various display items such as graphics, pictures, or words, or may include user prompting items such as menus, buttons, or slides. Elements also may include defined regions of the advertisement.

The activities monitored may include how long an object is displayed, which objects are selected by a user, which items are considered by a user according to the amount of time the cursor hovers over the items, measuring the time of presentation of an element in various ways, and/or activating hyperlinks.

The tracked interactions are preferably logged to a local memory by a downloadable Web browser applet embedded in the Web page, such as a program written in an interpretive language such as Java™. (Java™ is a trademark of Sun Microsystems Corporation of Sunnyvale, Calif.)

The logged interactions as stored in the local memory file are then sent to a remote server at appropriate times. For example, in the preferred embodiment, the logged interaction information may be included in a "dummy" HTTP GET message sent by the client to the server at the time the applet is taken down, such as when the user requests that a next page be displayed.

The logged interaction information may be flushed in other ways, such as by sending a POST message to the server either periodically or upon occurrence of certain events.

The invention therefore permits the tracking of user interactions with a Web page advertisement before subsequent actions, such as loading the advertiser's home Web page, occur. For example, the applet may intercept multiple interactions such as mouse clicks on objects to further qualify a user before loading a specific one of the advertiser's own home Web pages.

As a result, the advertiser may obtain information about what interests the user without the user having to leave the originally displayed Web page or performing other tasks which are perceived as being cumbersome and/or distracting from what the user was originally doing.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views.

DETAILED DESCRIPTION OF A PREFERRED EMBODIMENT

Figure 1:
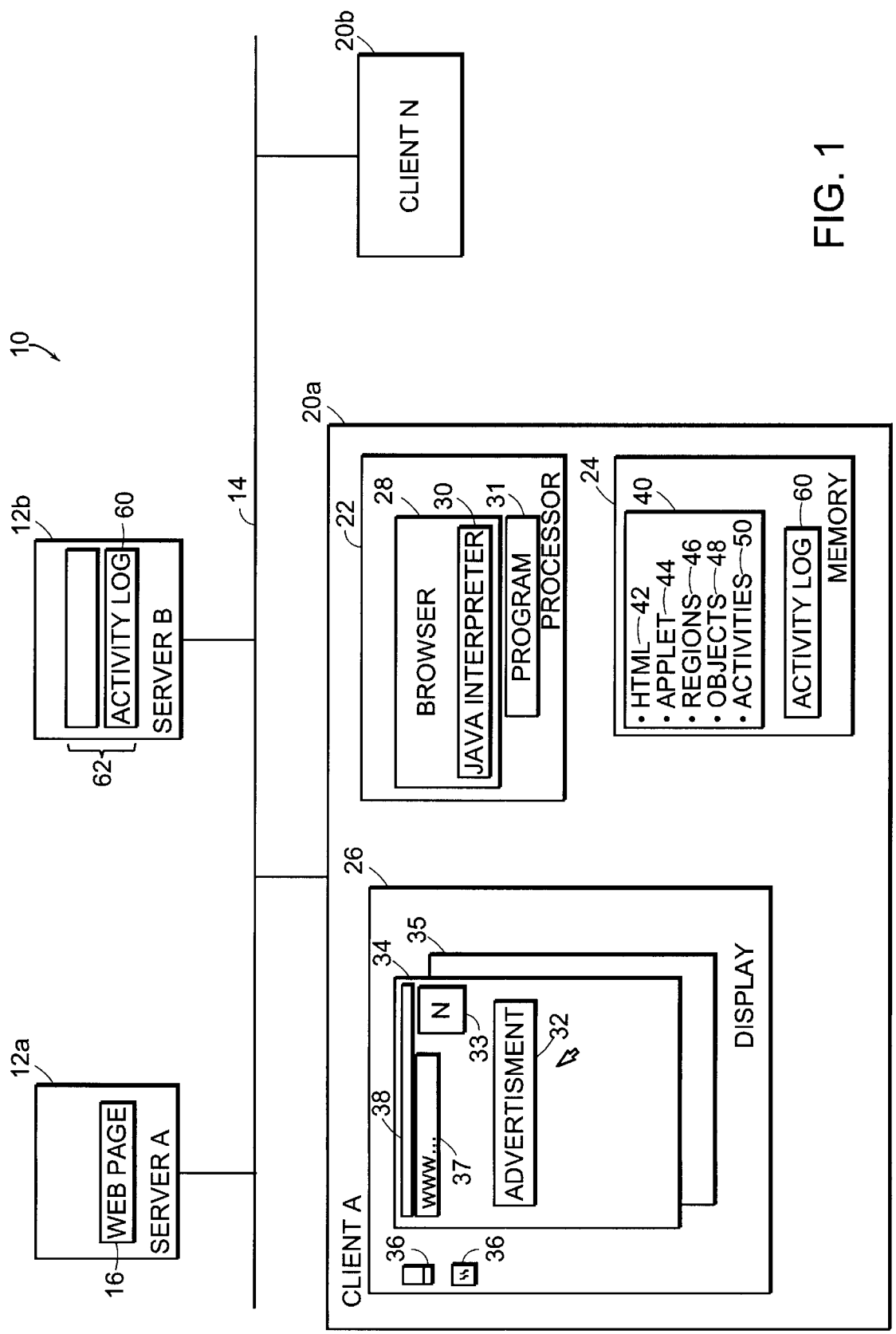
FIG. 1 is a block diagram of a distributed computing system illustrating a manner of tracking user interaction with a Web page according to the invention.

FIG. 1 is a block diagram of a distributed computing system 10. The distributed computing system 10 includes a number of computers 12, 20 interconnected by a communication media 14. The communication media 14, and in general the distributed computing system 10, may make use of any number of computer networking techniques such as local area networks (LANs), routers, dial-up connections, and/or other data communication techniques to form what has become known as an "intranet" or "internet." In the preferred embodiment, the present invention is employed in what has become known as "the Internet," which is an international computer network linking many millions of computers.

Typically the computers 12, 20 are personal computers, mini-computers, or the like. Certain of the computers in the distributed computing system 10 act as servers 12a, 12b, and are used primarily to store and supply information. One type of server 12a which is in widespread use on the Internet is known as a Web server that provides access to information stored in a form known as a Web page 16.

Other computers in the distributed computing system 10 known as clients 20a, . . . , 20n are typically controlled by one user. The typical client computer 20a includes, as for any computer, a processor 22, a memory 24, and a display 26. The client computers 20 allow a user to view Web pages 16 by "downloading" replica Web page files 40 to the client computer 20a from the server computer 12a over communication media 14. The Web page files 40 enable replication of the Web page 16 on the client computer 20a. The downloading function is specifically performed by a browser program 28, which preferably includes browser program software such as Netscape Navigator™ or Microsoft Internet Explorer™. (Netscape Navigator™ is a trademark of Netscape Communications Corporation of Mountain View, Calif., and Internet Explorer™ is a trademark of Microsoft Corporation of Redmond, Wash.) These browser programs include and/or permit the use of embedded interpretive languages 30, such as Java™, that may execute programs that are included in the Web page file 16.

The browser program 28 thus enables the user to create a view of the Web page 16, such as in a window 34 on the display 26. It should be understood that other windows 35 and other programs 36 may relate to other programs 31 that the user is presently running on the processor 22. In order to display the Web page 16, the browser program 28 typically downloads the Web page files to its local memory 24, storing it as a local replica 40. The Web page replica 40 includes various portions such as a Hypertext Markup Language (HTML) as well as other instructions for the Browser program 28 to format the Web page information in the window 34.

The Web page replica 40 also includes Java™ code 44 that includes instructions to be run while the user computer 20a is displaying the Web page.

The display of the Web page replica 40 in the window 34 may include various regions such as a user input area 37 where the user enters addresses of Web pages that he or she desires to view, and menus 38 for other actions associated with operating the browser program 28 itself.

Of interest to the description of the present invention is a Web page replica 40 that contains at least one advertisement area 39. The advertisement 39 on the Web page replica 40 is typically created by the provider of a service or product manufacturer. The advertisement 39 is typically used as an enticement for the user to download other Web pages specifically associated with the originator or author of the advertisement 39.

In accordance with the invention, the Java™ code 44 includes an applet program and data for tracking and logging the activities of the user in memory 24 while the user is viewing the Web page replica 40. The applet program 44 therefore permits the authors of the advertisement 39 to better understand how the users interact with the Web page advertisement in order to provide more effective advertising.

More specifically, the Web page replica 40 includes the Java™ code applet 44 that describes the particular attributes of the advertisement 39. Once the Web page replica 40 begins to display, the applet 44 also begins to execute in order to track and/or log user activities as they relate to various parts or objects of the advertisement 39.

For example, the applet 44 may include information that describes regions 46 of the advertisement 39, a list of visual elements 48 associated with the advertisement 39, and/or user activity definitions 50 that may take place within the context of the advertisement 39. The regions 46 may define areas within the advertisement 39, such as areas devoted to text or graphics. The elements 48 within the advertisement 39 may include various graphical images. The elements 48 may also include user prompts such as buttons, menus, slide bars, radio buttons, and the like.

The list of activity definitions 50 may include various types of user input. The most important user input is typically mouse position, as reflected by the position of a cursor 33, but these may also include other user inputs such as mouse clicks or keyboard inputs.

Figure 2:
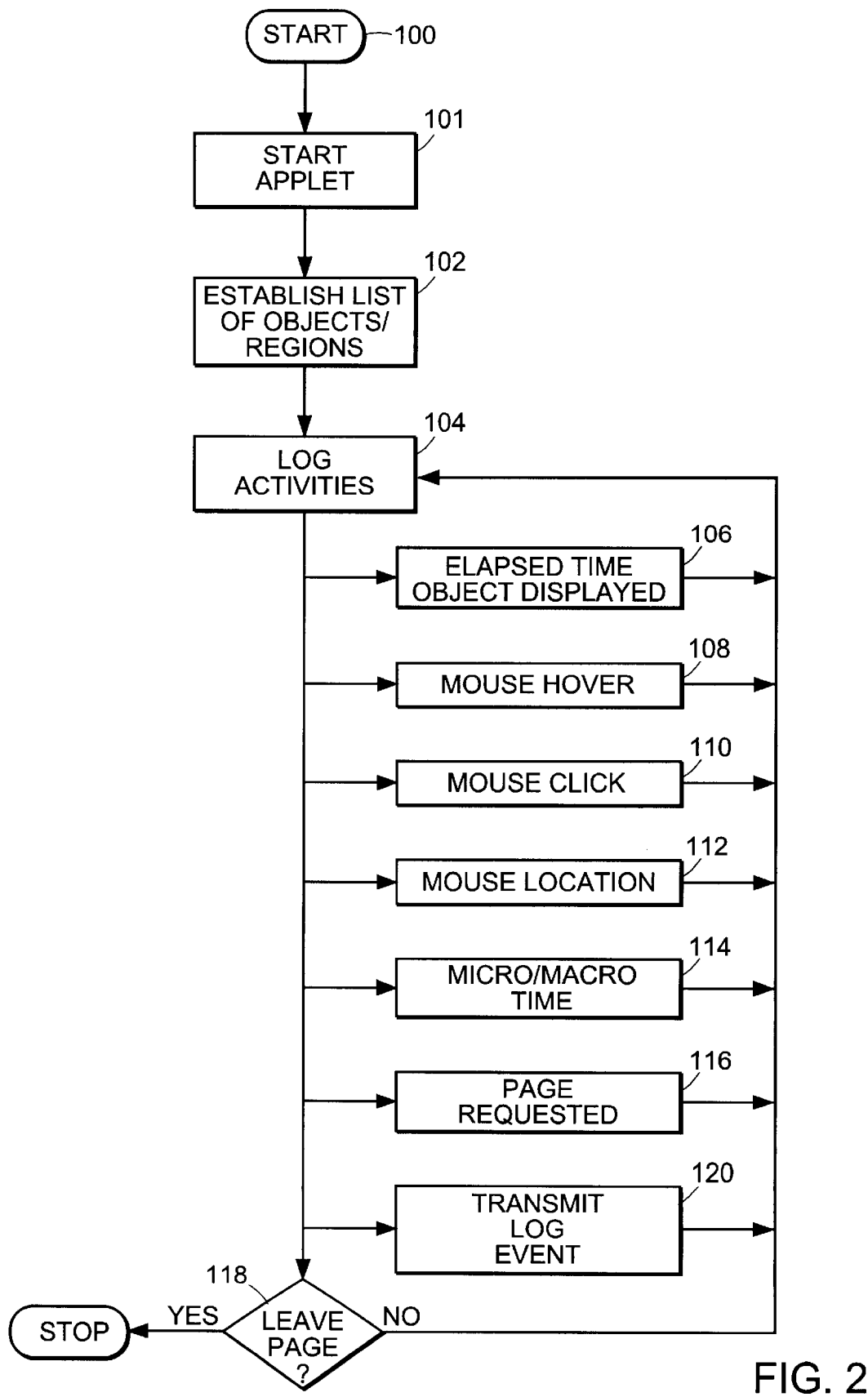
FIG. 2 is a flow chart of the operations performed by an applet program according to the invention.

FIG. 2 is a flow chart of the operations performed by the applet 44 in the process of tracking user interactions with the advertisement 39. An initial state 100 is entered when the applet is first started. This typically occurs when the user requests the display of the Web page 16 and the replica 40 has been downloaded or has at least begun being downloaded from the server 12a.

In the next state 101, the applet program 44 begins execution on the client computer 20a. This is typically in the context of an interpretative language such as the Java™ language executed within the browser 28. However, it should be understood that the applet may be implemented in other ways, as long as the applet 44 has access to the appropriate user inputs and local memory 24 for the logging of user activities with respect to the advertisement 39.

In the next state 102, the applet 44 establishes a local list of elements and regions on the Web page replica 40 associated with the advertisement 39 that are of concern.

A next state 104 is then entered in which user activities with respect to objects within the advertisement 39 may begin to be tracked by logging information in local memory locations 24 at the client 20. From this state 104, any number of states 106 through 114 and/or state 118 may be next entered for any given element 48.

For example, in state 106, the elapsed time that the element 48 has been displayed on the page is tracked.

In state 108, the fact that the mouse hovered near an element 48, i.e., the fact that the user moved the mouse within a region 46 of the page associated with the element 48 but did not actually click on the element, is tracked.

In state 110, the fact that the user clicked on an element 48 is tracked. It should be noted that this may include the tracking of one or more mouse clicks on one or more elements 48 by making multiple entries in the log 60. Thus, unlike the standard operation of an HTML hyperlink, a single mouse click may not necessarily automatically lead to the loading of the next Web page 16.

In state 112, the applet 44 tracks cursor 33 location at the moment of a mouse click with respect to the element 48.

In another state 114, the applet 44 may adjust the time frame associated with the particular action being logged. For example, when the user initially views a Web page 40, certain activities such as cursor 33 location may be tracked in short-time intervals such as microseconds. However, other items such as the elapsed time an element 48 is displayed on the page may be tracked in longer time intervals such as seconds. Certain items such as cursor hover time may initially be tracked in a microsecond time frame, and then, depending upon the amount of time the element has been displayed, will switch to tracking a longer time interval, such as seconds.

In state 116, the fact of the user requesting a different Web page is tracked.

It should be understood that, in states 106 through 114, data associated with the various user activities is logged in a portion of the memory 24 associated with maintaining an activity log 60.

Eventually, a state 118 is reached in which the user indicates that he or she wishes to leave the present page 40. This event is typically associated with loading another page in state 116 or may also include the closing of the browser program window 34.

At certain times, state 120 is entered in which the activity log 60 is sent from the local memory 24 by the applet 44 back to a server 12b. The server 12b is typically associated with the advertiser, or an advertisement rating service. This server 12b may or may not be the same server 12a from which the Web page 46 was originally downloaded. The applet 44 may then terminate.

In the preferred implementation of state 120, the activity log 13 is sent to the server 12b via a "dummy" HTTP GET message sent via a "back channel" to the server 12b at the time that the user leaves the present page 40. In particular, this back channel is a second network connection, different from the network connection used to fetch the Web page and download the applet in step 100. The dummy message is encoded as an HTTP GET with interaction log data shared in the GET message in such a way as to appear to be part of an extended address, for example. Thus, the browser program 28 does not need to perform any special functions or otherwise be modified.

However, the interaction log data may also be sent at other times. For example, while the advertisement is being displayed, the applet may periodically open a back channel connection and send a POST message to the server 12b. Alternatively, certain events may trigger sending the logged interaction data, such as when the user clicks on a particular part of the advertisement.

What is important is that the logged interaction data is eventually flushed to the server 12b, so that the author of the advertisement 39 may occasionally check on the collection 62 of activity logs stored at the server 12b and analyze the data in order to determine the effectiveness of the advertisement 39.

Figure 3:
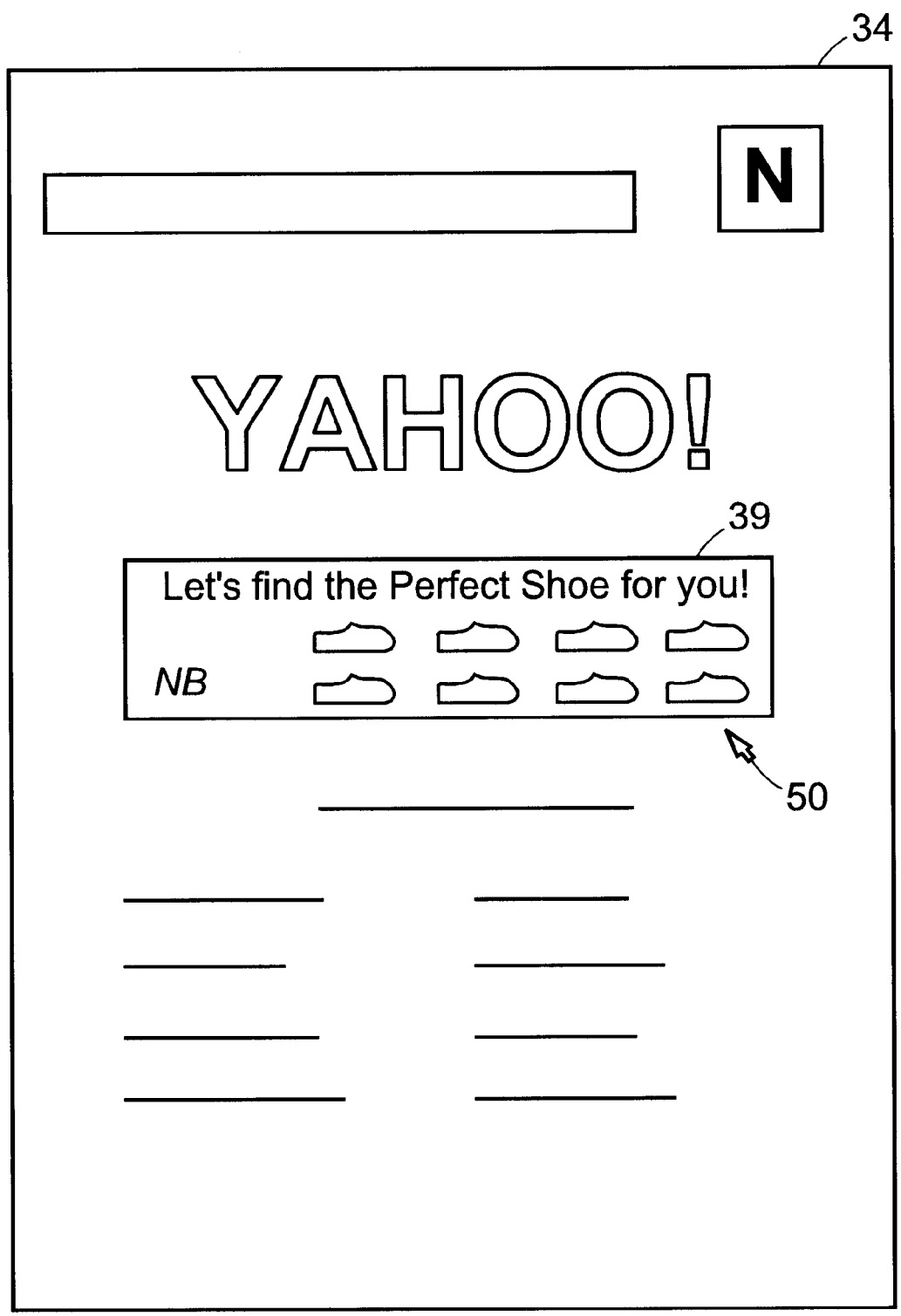
FIG. 3 is a typical Web page display illustrating how the invention may prequalify a user.

FIG. 3 is a view of a Web page such as that produced by a search engine such as Yahoo™. The advertisement 39 is typically displayed in a defined region on the Web page 40. In this example, the effectiveness of the advertisement 39 associated with the advertiser who is in the running shoe business is being tracked. In the example, the applet 44 tracks how long a user allows the mouse cursor 50 to hover near one of the eight possible displayed selections for running shoes. The applet 44 also tracks the position of the mouse to determine which one or more of the running shoes is selected by user-activated mouse clicks. This information is then sent to the logging server 12b and is used prior to loading the manufacturer's Web page. Thus, the relative interest in a particular type of shoe may be gauged before the advertiser's Web page is loaded or, indeed, a lack of interest, in particular lead or "teaser" items, may be determined prior to the user requesting that the manufacturer's Web page be loaded.

It is now understood how the invention provides various advantages over the prior art. In particular, the invention includes an applet 44 that is downloaded together with a Web page 40 (Web page files) capable of logging the user's interactions with elements 48 on the page. The applet in particular logs user interactions with the page 40 that indicates user interest to an advertiser. By identifying regions on the page and then tracking user activity and relating it to the particular elements or regions on the page, the advertiser may therefore more effectively evaluate the effectiveness of particular objects in the advertising.

By collecting the interaction data locally and then sending them to a server which logs data locally via a back channel, the operation of the client computer or data stored thereon need not be permanently modified.

By tracking multiple interactions before loading the advertiser's own Web page, the advertiser may prequalify a user and hence customize or tailor information to be displayed. In turn, the advertiser may more effectively present the information once the advertiser's Web page is requested by the user.

The user may also be enticed to interact with a Web page advertisement, thereby disclosing information about the user's interests, without their actually requesting the loading of Web pages associated with the advertiser.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. In a distributed computing system for displaying information, a method comprising the steps of displaying to a user a representation of a page in electronic form, the page containing at least one advertisement composed of two or more regions, each region containing a visual element of the advertisement;

tracking user micro-interactions with each of the elements in the advertisement through the steps of:

maintaining a list of elements displayed in the advertisement;

determining when a screen pointer hover occurs within a particular element of the advertisement, and the screen pointer hover occurring without requiring a user interaction on the element; and creating a micro-interaction data record in response thereto;

logging the micro-interaction data records while the advertisement is being displayed to the user;

sending the micro-interaction data records to a remote server by opening a connection to the remote server and sending an HTTP GET message to the remote server over the connection, the HTTP GET message containing the micro-interaction data records; and wherein the micro-interaction data records are encoded as to appear as part of an extended dummy address field in the HTTP GET message.

* * * * *